T. WATKINS.
TRAP.
APPLICATION FILED SEPT. 18, 1913.
1,117,536.
Patented Nov. 17, 1914.
2 SHEETS—SHEET 1.
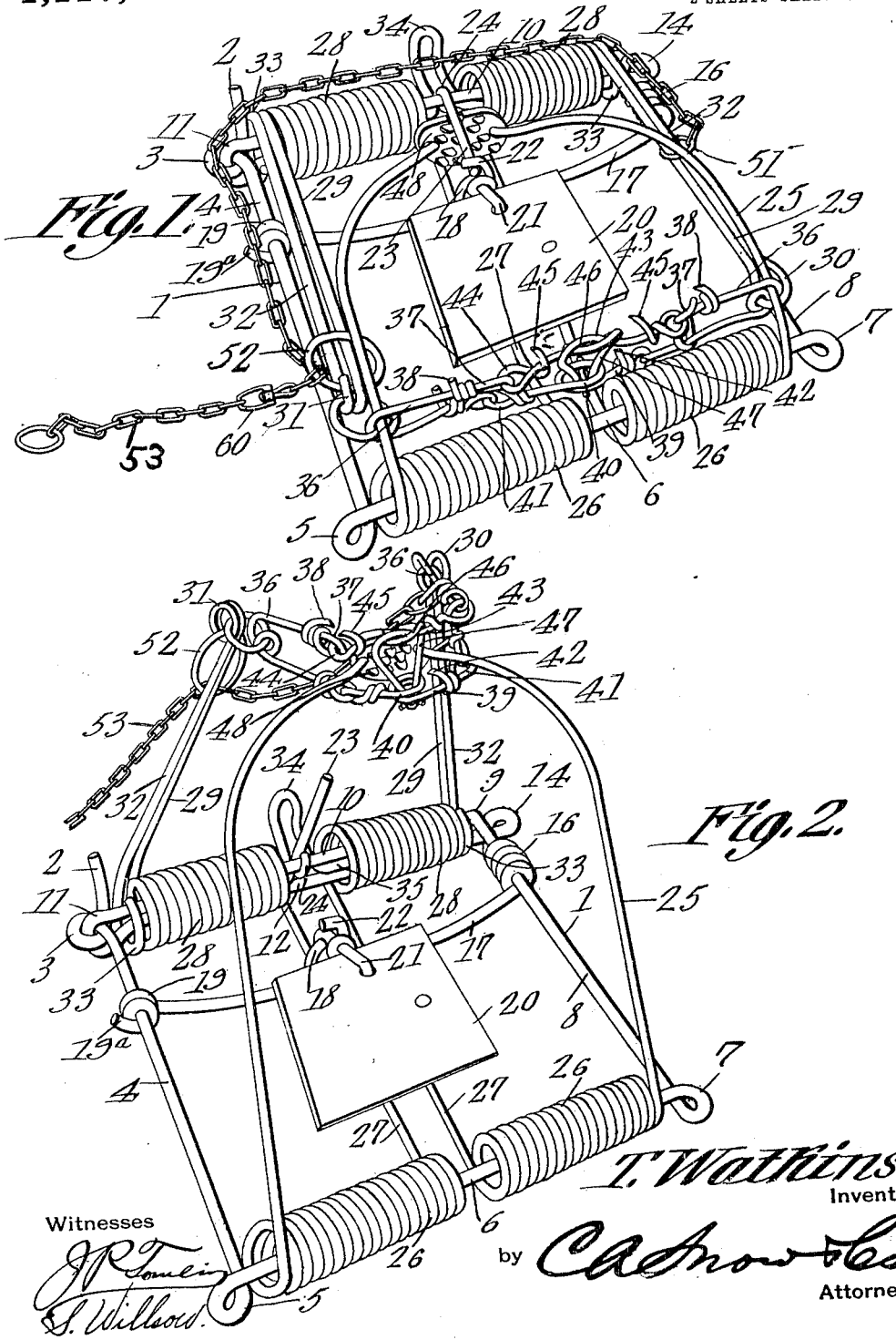
Witnesses
T. Watkins
Inventor
by C. A. Snow & Co.
Attorneys

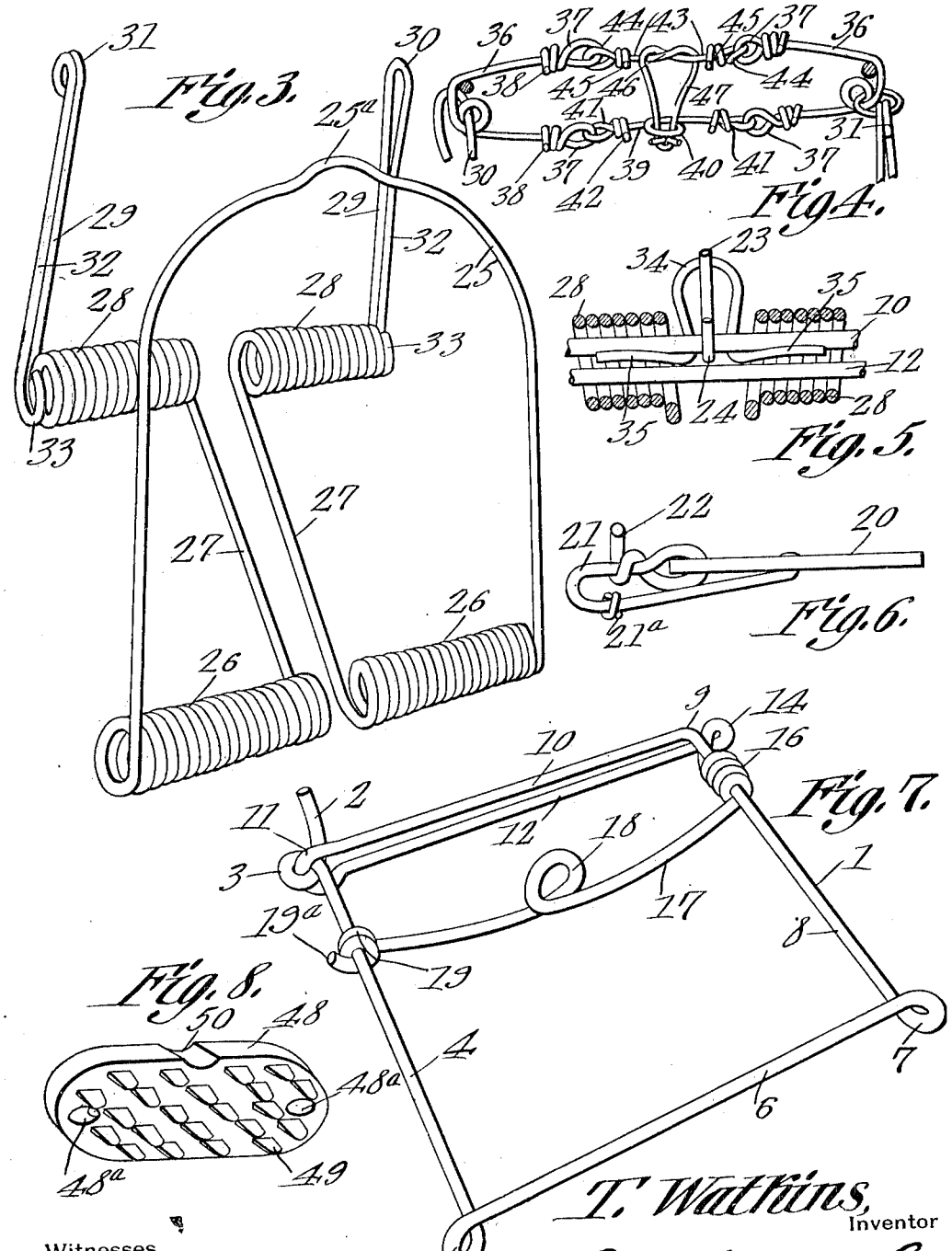

UNITED STATES PATENT OFFICE.

TOM WATKINS, OF GATEWAY, COLORADO.

TRAP.

1,117,536.  Specification of Letters Patent.  Patented Nov. 17, 1914.

Application filed September 18, 1913. Serial No. 790,514.

*To all whom it may concern:*

Be it known that I, TOM WATKINS, a citizen of the United States, residing at Gateway, in the county of Mesa and State of Colorado, have invented a new and useful Trap, of which the following is a specification.

The device forming the subject matter of this application is a trap, adapted to engage the leg of an animal.

One object of the invention is to provide a trap in which the tethering chain acts as a snare.

Another object of the present invention is to provide a trap of the class described having a leg grip of novel form, novel means being provided for actuating and controlling the grip.

Another object of the invention is to provide novel means for maintaining the trap in a set condition and for actuating the grip and attendant parts to holding positions.

Another object of the invention is to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings: Figure 1 is a perspective view showing the trap set; Fig. 2 is a perspective view showing the trap sprung; Fig. 3 is a perspective of the resilient portion of the trap; Fig. 4 is a transverse section showing the grip in elevation; Fig. 5 is a section through one of the springs; Fig. 6 is an elevation of the trigger and attendant parts; Fig. 7 is a perspective of the base; Fig. 8 is a perspective of the grip plate.

In carrying out the invention there is provided a base 1 which is shown in clearest detail in Fig. 7. The base 1 preferably is fashioned from a single piece of heavy wire, one end 2 of which is bent upon itself to form an eye 3, the eye 3 being continued to form a side bar 4. The side bar 4 is bent upon itself to form an eye 5 and is continued as shown at 6 to form an end bar, the end bar 6 being bent upon itself to form an eye 7 and being continued to form a side bar 8 which is parallel to the side bar 4. The side bar 8 is rectangularly bent as shown at 9 to form a primary end bar 10, the end bar 10 being looped upon itself as indicated at 11, to pass through the eye 3. The looped portion 11 is continued to form a secondary end bar 12 lying beneath the primary end bar 10, the end bar 12 terminating in an eye 14, the extremity of the eye 14 being twisted as indicated at 16 around the side bar 8. From the twisted portion 16, the constituent material of the base 1 is carried transversely, and in a direction substantially parallel to the end bar 6, to form a brace 17, twisted upon itself intermediate its ends to form an eye 18, the free end of the brace 17 being twisted as indicated at 19 around the side bar 4 to form a finger 19ª.

A trigger plate 20 is provided, the same being shown in detail in Fig. 6. A loop 21 is attached to the trigger plate 20 and is engaged through the eye 18 to afford a pivotal mounting for the trigger plate, one end of the loop 21 being twisted to form a finger 22. There is a projection 21ª on the loop 21, which projection may take the form of a piece of wire twisted around one portion of the loop. This projection 21ª coöperates with the twisted, finger forming portion 22 in holding the trigger plate 20 in place for pivotal movement on the eye 18. A latch 23 is adapted to engage with the finger 22, the latch 23 being provided with an eye 24 which is engaged around the primary end bar 10.

The invention further includes a resilient loop and a pair of resilient arms. The loop is indicated at 25, the extremities of the loop 25 being bent to form coaxial helical springs 26 which receive the end bar 6. The inner ends of the helical springs 26 are extended to form a two-part trigger support 27, the constituent members of the support 27 being engaged upon opposite sides of the eye 18. The parts of the support 27 are continued to form helical springs 28 which surround the primary end bar 10 and the secondary end bar 12. At their outer ends, the helical springs 28 are prolonged radially to form extensions 29. One of the extensions 29 is looped upon itself as shown at 30, and the other of the extensions 29 is twisted upon itself to form an eye 31, the looped portion 30 and the eye 31 being prolonged to form extensions 32, terminating in eyes 33 engaged around the end bars 10 and 12 at the ends of the helical springs 28. The end 2 of the base 1 upon the one hand and the bend indicated at 9 upon the other hand engage with the respective eyes 33 and hold the same against movement longitudinally of the end bars 10 and 12. The extensions 29 and 32 form what for convenience may be denominated resilient arms, and it is to be understood that the loop 25 is resilient also.

The invention further includes a loop shaped head 34, shown most clearly in Fig. 5. The function of the head 34 is to aid in supporting the chain 53 as will be described hereinafter. The head 34 is curved and extends between the end bars 10 and 12, the head terminating in laterally extended fingers 35, engaged within the springs 28.

Referring to Fig. 2 and comparing the same with Fig. 4 it will be observed that a pair of U-shaped members 36 are connected with the eye 31 and with the loop 30 of the resilient arms 29—32. The extremities of the U-shaped members 36 are bent upon themselves to form eyes 37, the extremities of which are prolonged to form barbs 38. A tie 39 is provided, the same being bent upon itself intermediate its ends to form an eye 40. At its ends, the tie 39 is fashioned into eyes 41, engaging one pair of the eyes 37, the extremities of the eyes 41 being prolonged to form barbs 42. A pair of ties 43 are provided, the same being fashioned into eyes 44, engaging the other pair of eyes 37, the extremities of the eyes 44 being prolonged to form barbs 45. The ties 43 are crossed upon themselves as indicated at 46 and are extended to form fingers 47 which pass through the eye 40.

A grip plate, indicated at 48 and shown in detail in Fig. 8 is provided, the same being equipped with openings 48ª, through which the loop 25 passes, to the end that the plate 48 may be held at the end of the loop, the loop being offset slightly, as shown at 25ª, to facilitate the holding of the grip plate in place. The grip plate 48 is equipped with outstanding teeth 49 and carries in one edge a notch 50 adapted to receive the latch 23. A ring 51 is mounted to slide upon one of the arms 29—32. Secured to the ring 51 is a flexible tether 53, carrying a swivel 60 and preferably taking the form of a chain, and extended through a ring 52 which is secured in the eye 31 of the other arm 32—29. The chain 53 may be of any desired form but preferably it is constructed so that it will slide readily through the ring 52. It is to be observed that the ring 52 is concatenated with the eye 31 which is connected with the element 36. The ring 52, the eye 31, the U-shaped elements 36 and the various flexible connections between the U-shaped elements 36 may be described as a yieldable grip. This grip, as will be understood best from Fig. 1, is mounted to slide on the resilient loop 25, toward and away from the helical springs 26.

Presupposing that the parts are positioned as shown in Fig. 2, the operation of the device is as follows: The resilient loop 25 is pressed downwardly toward the base 1, so that the end of the loop 25 travels toward the springs 28, the resilient arms 32—29 being pressed down, so that their free ends travel toward the springs 26. During this operation, the U-shaped members 36 which constitute a part of the flexible grip, slide along the side portions of the loop 25 and approach the springs 26 as will be understood best from Fig. 1. The latch 23 is engaged in the notch 50 of the grip plate 48, the extremity of the latch 23 being engaged beneath the finger 22 which constitutes a part of the trigger. The ring 51 is slid along the arms 29—32 until it is disposed as shown in Fig. 1, comparatively near to one of the springs 28, the chain being supported on the projections 19ª—3—34—14, so that the chain will not be caught under the trap. The swivel 60 then lies close to the ring 52, as shown in Fig. 1. In this manner, the trap will be disposed in the set position shown in Fig. 1. An animal, approaching the trap, places its foot within the contour of the loop 25, upon the trigger plate 20, and between the end of the loop 25 upon the one hand and the flexible grip 36—39—42 upon the other hand. When the trigger plate 20 is depressed by the foot of the animal, the finger 22 will be disengaged from the latch 23, whereupon the loop 25 and the arms 32—29 will spring upwardly, into the positions shown in Fig. 2. The flexible grip which connects the ends of the arms 29—32 will slide upon the loop 25 toward the end of the loop. The leg of the animal will thus be caught between the grip plate 48 and the pronged flexible grip 36—39—42. Thus, the animal will be held securely. The normal tendency of the pair of arms 29—32 is to spring toward the longitudinal center of the base 1, and as a consequence, the flexible grip will be disposed in U-shape, as shown in Fig. 2, and will be engaged around the leg of the animal. Owing to this normal tendency of the arms, the same may be described as being yieldably constrained toward the longitudinal center of the base. The tethering chain 53 is made fast to a support of any sort, and when the trapped animal pulls to free itself, the chain 53, sliding through the ring 52, will act as a snare and will draw the arms 29—32 toward each other and engage the flexible grip more firmly around the leg of the animal.

The trap herein disclosed will hold the leg of the animal securely, but without putting undue constriction upon the leg. When the leg is constricted to too great an extent, the leg becomes numb, and in cold weather freezes. When the leg is frozen or numb the animal not infrequently gnaws the leg off and frees itself. In the trap herein disclosed, a firm grip upon the leg is provided, but the circulation is not impeded. The leg therefore retains a sense of feeling and the animal will not gnaw the leg and set itself free from the trap.

Having thus described the invention, what is claimed is:—

1. In a device of the class described, a base; a spring actuated loop carried by the base; a pair of spring actuated arms carried by the base; a flexible grip connecting the arms and slidable upon the loop, to coöperate with the end of the loop; trigger mechanism for holding the loop and the arms set; and means for drawing the ends of the flexible grip toward each other.

2. In a device of the class described, a base; a spring actuated loop carried by the base; a pair of spring actuated arms carried by the base; a flexible grip connecting the arms and slidable upon the loop to coöperate with the end of the loop, the arms being yieldably constrained toward the longitudinal center of the base to swing the ends of the grip toward the longitudinal center of the base; and trigger mechanism for holding the loop and the arms set.

3. In a device of the class described, a base; a spring actuated loop secured to the base; a flexible grip slidable upon the loop and coacting with the end of the loop; a flexible tethering member; means for connecting the tethering member with one end of the grip; and means for slidably connecting the tethering member with the other end of the grip; and trigger mechanism coacting with the loop.

4. In a device of the class described, a base; a spring actuated loop carried by the base; a pair of resilient arms carried by the base; a grip connecting the arms and slidable upon the loop to coöperate with the end of the loop; a tethering member; means for connecting the tethering member to one arm; means for slidably connecting the tethering member with the other arm and trigger mechanism for holding the loop and the arms set.

5. In a device of the class described, a base; a pair of resilient arms carried by the base; a flexible grip secured to the arms; a tethering member secured to one arm; means for slidably connecting the tethering member with the other arm; and trigger mechanism for holding the arms depressed.

In testimony that I claim the foregoing as my own, I have hereto affixed my signature in the presence of two witnesses.

TOM WATKINS.

Witnesses:
MOLLIE E. HAMILTON,
BENJAMIN RICE.

Copies of this patent may be obtained for five cents each, by addressing the "Commissioner of Patents, Washington, D. C."